Aug. 3, 1954  C. C. S. LE CLAIR  2,685,201
POSITIVE DISPLACEMENT LIQUID METER
Filed Feb. 20, 1951  4 Sheets-Sheet 1

Inventor:
Camille Clare Sprankling Le Clair
By Hinkle, Horton, Ahlberg & Kupper
Attorneys.

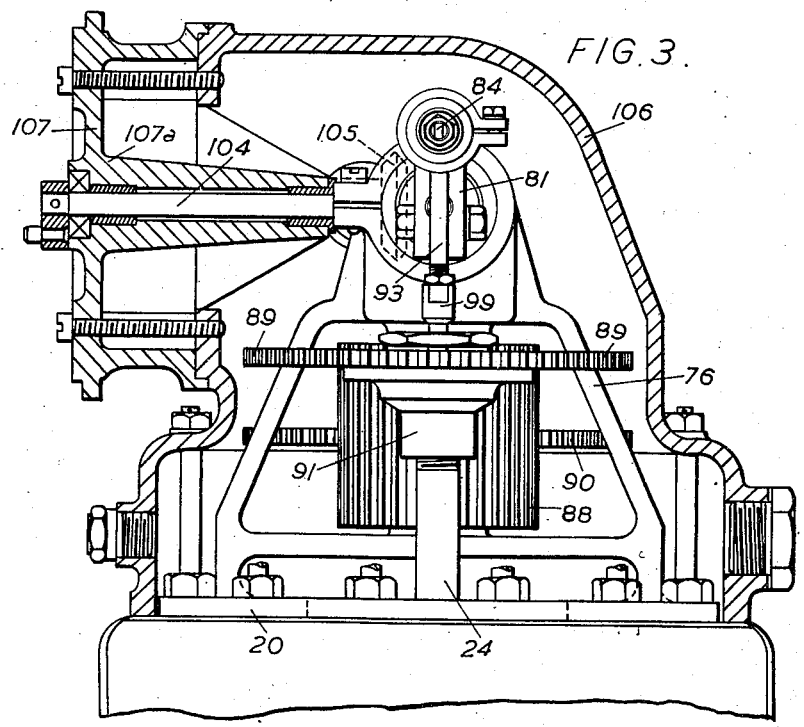
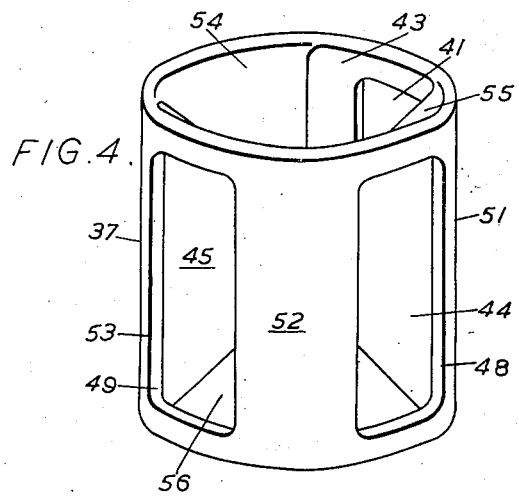

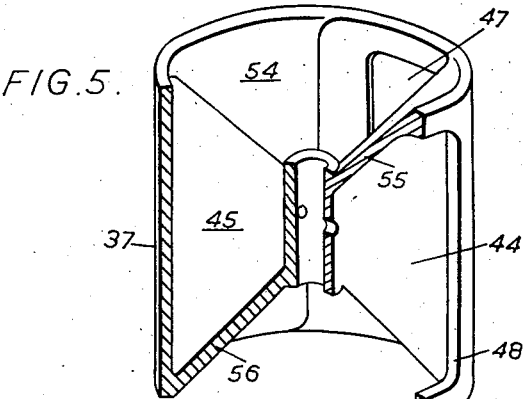
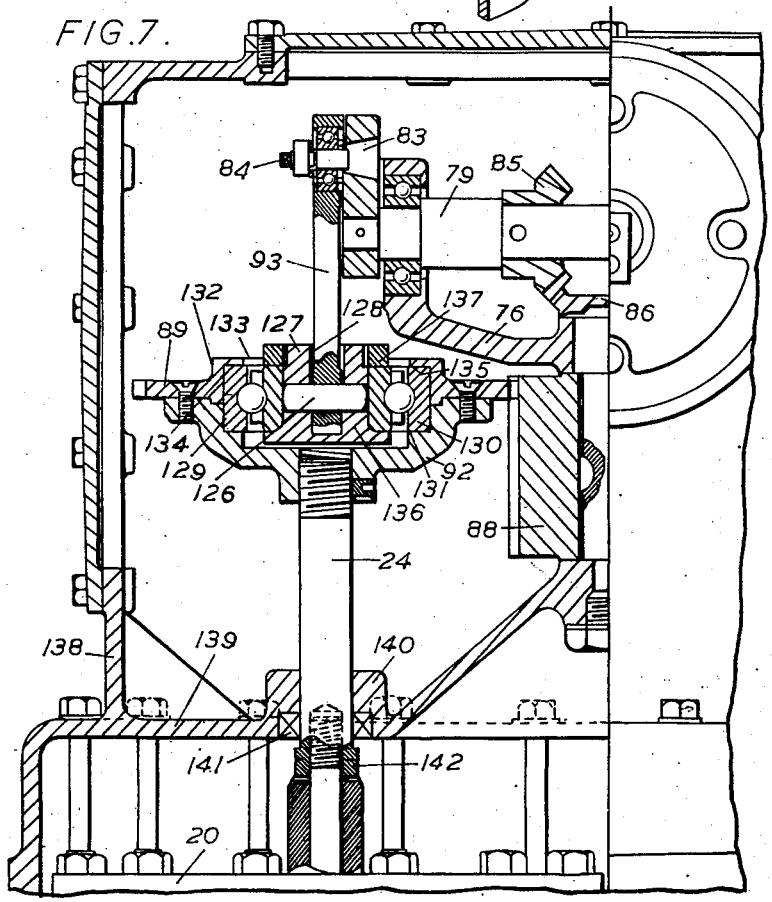

Aug. 3, 1954 — C. C. S. LE CLAIR — 2,685,201
POSITIVE DISPLACEMENT LIQUID METER
Filed Feb. 20, 1951 — 4 Sheets-Sheet 4

Inventor:
Camille Clare Sprankling Le Clair
By Hinkle, Horton, Ahlberg & Wupper
Attorneys.

Patented Aug. 3, 1954

2,685,201

UNITED STATES PATENT OFFICE 2,685,201

POSITIVE DISPLACEMENT LIQUID METER

Camille Clare Sprankling Le Clair, Crabtree, Plymouth, England, assignor to Tecalemit Limited, Plymouth, England Application February 20, 1951, Serial No. 211,906

Claims priority, application Great Britain March 2, 1950

8 Claims. (Cl. 73—242)

This invention relates to improvements in positive displacement liquid meters.

Liquid meters are known in which cylindrical pistons are carried entirely by their piston rods. The pistons do not touch the bores of their cylinders and they also have ports in their walls, thus enabling each piston to act as its own valve. The pistons carry out their valve operation by virtue of a combined reciprocating and angular oscillating motion.

Such meters have the disadvantage that the maximum velocity of angular oscillation of the pistons sets a limit on the maximum velocity due to the inertia forces.

The object of the present invention is to overcome this disadvantage by providing a meter in which such inertia forces cannot arise.

With the above object in view, this invention provides a positive displacement liquid meter, comprising at least two double-acting pistons which are reciprocable in cylinders in the meter under the pressure of the liquid flowing through the meter, and mechanism which interconnects the pistons in such a manner that the pistons are not only caused to reciprocate but also to rotate continuously in the same direction during their reciprocating movements, the reciprocating motion of all the pistons being communicated continuously to the meter counter mechanism, and means being provided for controlling the flow of the liquid from the inlet side of the meter through the cylinders and out of the latter to the outlet side of the meter.

The meter may comprise two or more double-acting pistons which are reciprocable in cylinders in the meter under the pressure of the liquid flowing through the meter from the inlet to the outlet side of the latter, and mechanism which interconnects the pistons in such a manner that the pistons are not only caused to reciprocate but also to rotate continuously in the same direction in their cylinders during their reciprocating movements, the pistons being angularly displaced relatively to each other in their cylinders and being formed to act as valves which control the flow of liquid through the meter cylinders from the inlet to the outlet side of the meter and ensure that the pressure of liquid flowing through the meter shall act to reciprocate the pistons in their cylinders continuously as long as the liquid flows through the meter.

The reciprocating motion of the pistons is communicated to the meter counter mechanism, and their rotary motion is used to open and close ports and thus to control the flow of liquid into and out of the metering cylinders.

The pistons are formed with angularly-spaced ports which, by co-operation with angularly-spaced ports in the cylinders, during the continuous reciprocating and turning movements of the pistons and in timed-relationship, control the flow of liquid passing through the meter into the cylinders from an inlet passage in the meter and out of the cylinders into an outlet passage in the meter, such passages being isolated from each other. The arrangement is such that liquid is simultaneously admitted to, and is discharged from, each cylinder, so that when liquid pressure acts to thrust the piston downwards, for example, liquid previously admitted to the cylinder to thrust the piston upwards is simultaneously allowed to flow out of the cylinder.

In a meter which comprises two metering cylinders, the said mechanism which is used to interconnect the pistons, may comprise a crankshaft or equivalent. If a crankshaft is used it may be connected to the piston rods of the pistons by connecting rods, and gearing which couples the crankshaft to the piston rods so that the latter are caused to turn as they reciprocate. The two crankpins are angularly displaced, at 90° for example, so that the piston which is changing the angular position of its ports at one of its dead centres is being driven by the other piston which is in its mid-stroke position and thus able to develop the maximum force.

In a constructional form of the invention which comprises two metering cylinders and which wlil be described hereinafter, the said gearing includes a synchronising pinion which is driven from the crankshaft and drives, at half its speed, synchronising gear wheels fixed to the piston rods. Each piston, therefore, rotates through 90° when carrying out one stroke.

Each cylinder comprises an inlet port, which communicates with the meter inlet passage, and an outlet port which communicates with the meter outlet passage. Each piston is hollow and comprises four angularly-spaced ports, each open to a compartment in the piston, the four compartments being isolated from each other. Two of the compartments are open to the bottom of the cylinder but not to the top and the other two compartments are open to the top of the cylinder but not to the bottom. The purpose of this arrangement will be described hereinafter.

The meter counter mechanism is driven from the crankshaft and means are provided for adjusting the meter for volumetric accuracy.

Thus, each of the crankpins may be eccentrically mounted upon its crankweb so that the effective throw of the crankshaft, and thus the piston stroke, may be adjusted by turning the crankshaft in its mounting.

As an alternative, one of the piston rods, or each rod, or a rod connected thereto may be used as the plunger of a calibrating or compensating pump and to this end may be slidable in a pump cylinder having inlet ports which are opened and closed by the plunger and are in communication with the meter outlet. The pump cylinder outlet is controlled by a valve which, when unseated, allows liquid forced out of the cylinder by the piston to pass to the meter inlet. The pump cylinder is axially adjustable, so that the position of the inlet ports relative to the plunger may be adjusted, so as to vary the quantity of liquid admitted to the pump cylinder from the meter outlet and discharged to the meter inlet.

The accompanying drawings show, by way of example, one constructional form of the invention applied to a positive displacement meter having two metering cylinders.

In the drawings:

Fig. 3 is a fragmentary end elevation, partly in section, of the meter;

Fig. 4 is a perspective view of one of the metering pistons;

Fig. 5 is a section on the planes B—B and C—C in Fig. 4;

Fig. 7 is a fragmentary sectional elevation of the meter fitted with modified means for connecting the crankpins to the synchronising gear wheels which are fixed to the meter piston rods.

Figure 1:
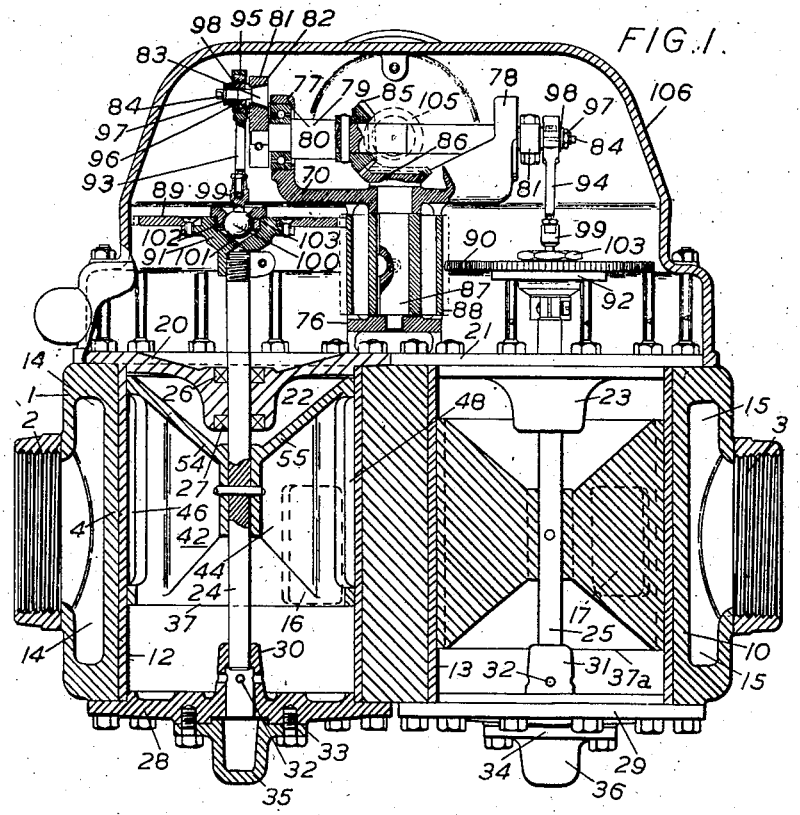
Fig. 1 is a sectional elevation of the meter.
Figure 2:
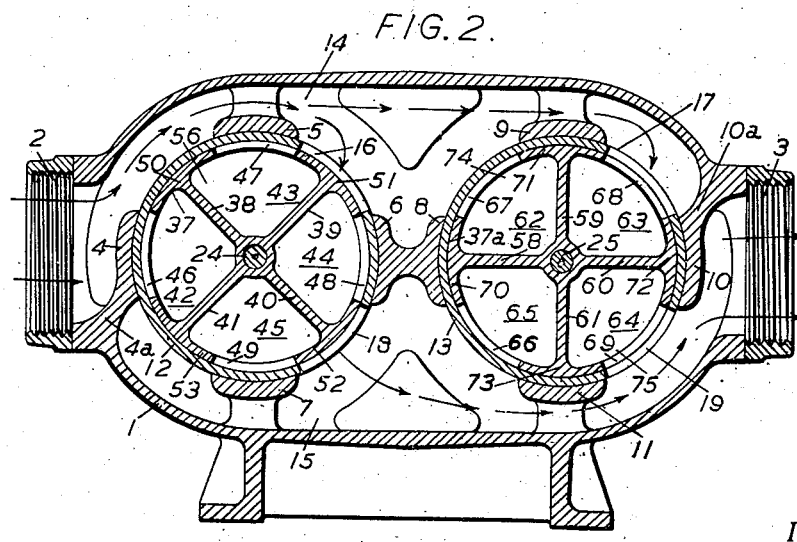
Fig. 2 is a section on the line A—A in Fig. 1.

Referring to the drawings:

In this constructional form of the invention the meter comprises a body 1 having a liquid inlet 2 at one end and a diametrically-opposite liquid outlet 3 at the other end. As shown in Figs. 1 and 2, the body is formed internally with two sets of four vertical abutments or ribs 4, 5, 6 and 7, and 8, 9, 10 and 11 the abutments of each set of which are spaced at right angles to each other. The abutments of each set are machined so as to provide four seatings for a vertical cylinder, the two cylinders 12 and 13 being spaced at equal distances from the centre of the body and parallel to each other. The abutment 4 is disposed near to the liquid inlet 2 and is integral with a vertical partition 4a. Similarly, the abutment 10 is disposed near to the liquid outlet 3 and is integral with a vertical partition 10a. The two partitions 4a and 10a in conjunction with the cylinders serve to isolate an inlet passage 14 cast in the body between the top and bottom faces thereof from an outlet passage 15 which is also cast in the body between the top and bottom faces thereof. As shown in Fig. 2, the inlet passage 14 runs from the inlet 2 around the cylinders 12 and 13 on one side of the centres of the latter to the partition 10a which is adjacent to the liquid outlet 3 and the outlet passage 15 runs around the cylinders on the opposite side of the centres of the latter to the partition 4a which is adjacent to the liquid inlet. Between the cylinders the inlet and outlet passages are isolated from each other by the abutments 6 and 8 which are integral.

The cylinders are formed respectively with elongated vertical inlet ports 16 and 17, each of which subtends an angle of 45° at its cylinder centre and is adapted to provide communication between the inlet passage 14 and the interior of the cylinder. The cylinders are also formed respectively with elongated vertical outlet ports 18 and 19 of the same depth and location relatively to the tops and bottoms of the cylinders as the ports 16 and 17, each of which subtends an angle of 45° at its cylinder centre and is adapted to provide communication between the outlet passage 15 and the interior of the cylinder. The centres of the two ports 16 and 18 and of the ports 17 and 19 are spaced at 90° apart.

The top ends of the cylinders 12 and 13 are closed by covers 20 and 21 having central bosses 22 and 23 bored to provide guides for two piston rods 24 and 25, which will be referred to hereinafter, spaced sealing gaskets 26 and 27 being fitted in each boss around the respective piston rod so as to prevent leakage of the liquid from the cylinder along the rod. The bottom ends of the cylinders are closed respectively by covers 28 and 29, which are integral with upwardly-projecting hollow bosses 30 and 31 formed respectively with guiding holes for the lower ends of the piston rods 24 and 25 and with ports 32 which provide communication between the interior of the bosses and the interior of the cylinders. Caps 33 and 34, which are formed with downwardly-projecting hollow bosses 35 and 36, are fixed to the bottom covers and close the lower ends of the bores of the above mentioned bosses 30 and 31 on the bottom covers. The ports 32 serve as vents for pressures built up within the bosses 35 and 36.

Within the cylinder 12 a hollow piston 37 is fixed to the piston rod 24 and within the cylinder 13 a hollow piston 37a is fixed to the piston rod 25. The piston 37 comprises an outer wall or sleeve which is slidable in the cylinder 12 and a central boss which is fixed (such as by pinning) to the piston rod 24. The sleeve is connected to the central boss by four vertical radial web members 38, 39, 40 and 41 which are arranged at right angles to each other and serve to divide the horizontal section of the piston into four compartments 42, 43, 44 and 45. Vertical ports 46, 47, 48 and 49 are formed in the parts of the piston sleeve respectively between the web members 41, 38; 38, 39; 39, 40; and 40, 41, each of these ports subtending 45° of arc at the centre of the piston. The ports, which are separated from each other by four imperforate parts 50, 51, 52 and 53 of the sleeve which also subtend 45° of arc at the centre of the piston, thus communicate respectively with the compartments 42, 43, 44 and 45.

The upper ends of compartments 42 and 44 in the piston 37 which are on opposite sides of the centre of the piston are closed by downwardly-sloping walls or diaphragms 54 and 55, Fig. 1, which connect the piston sleeve to the centre boss and are integral respectively with the web members 38, 41, and 39, 40. The lower ends of the other two compartments 45 and 43 in the piston are also closed by like upwardly-sloping walls or diaphragms (one of which, designated 56, is shown in Figs. 4 and 5) which also connect the piston sleeve to the centre boss and are integral respectively with the webs 38, 39 and 40, 41. The two upper diaphragms 54 and 55 isolate the compartments 42 and 44 below them from the cylinder space above them but the compartments are open to the cylinder spaces below them. From the above description, it will be understood that the liquid cannot flow upwards or downwards through the piston.

The piston 37a comprises an outer wall or sleeve, which is slidable in the cylinder 13, and a central boss which is fixed (such as by pinning) to the piston rod 25. The sleeve is connected to the central boss by four vertical radial web members 58, 59, 60 and 61 (Fig. 2) which are arranged at right angles to each other and serve to divide the horizontal section of the piston into four compartments 62, 63, 64 and 65. Vertical ports 66, 67, 68 and 69 are formed in the parts of the piston sleeve respectively between the web members, each of these ports subtending 45° of arc at the centre of the piston. The ports, which are separated from each other by four imperforate parts 70, 71, 72 and 73 of the sleeve which also subtend 45° of arc at the centre of the piston, thus communicate respectively with the compartments 62, 63, 64 and 65.

The lower ends of the compartments 62 and 64 in the piston are closed by upwardly-sloping walls or diaphragms 74 and 75 like the walls or diaphragms 56 in the piston 37, see Fig. 1, and the upper ends of the other two compartments 63 and 65 are also closed by similar downwardly-sloping diaphragms which are not shown. The two lower diaphragms 74 and 75 isolate the compartments 62 and 64 above them from the cylinder space below them but the compartments are open to the cylinder space above them. Similarly, the said upper sloping diaphragms isolate the compartments 63 and 65 from the cylinder space above them but these compartments are open to the cylinder space below them. A bracket 76 having two upwardly-projecting arms 77 and 78, Figs. 1 and 3, is mounted upon the top of the meter body 1 and a crank-shaft 79 is turnably mounted in ball bearings 80 (one only of which is shown) fitted in the arms. At each end the crankshaft is provided with a crank web 81 formed with a conical hole 82 in which the conical head 83 of a crankpin 84 is adjustably fitted, the two crank webs being set at 90° of angle apart. A mitre wheel 85 is fixed upon the cranksshaft and is geared with a second mitre wheel 86 fixed at the upper end of a vertical shaft 87 which is turnably mounted in the bracket 76 symmetrically between the two metering cylinders 12 and 13 above the centre of the meter body. The two mitre wheels have the same number of teeth. A deep spur pinion 88 is fixed upon the vertical shaft 87 and the teeth of two large diameter spur wheels 89 and 90 are engaged with those of the spur pinion on opposite sides of the latter. In this particular construction each spur wheel has twice as many teeth as the spur pinion. The top ends of the piston rods 24 and 25 are respectively fixed in split-bosses 91 and 92 on the underside of the spur wheels 89 and 90.

The piston rod 24 is coupled to the crankpin 84 shown on the left in Fig. 1 by means of a connecting rod 93, and the piston rod 25 is coupled to the crankpin 84 on the right by means of a connecting rod 94. The upper end of each connecting rod is mounted upon a ball bearing 95 (only that on the left of Fig. 1 being shown) arranged on the shank of the crankpin 84, a collar 96 being interposed between the back of the ball-bearing and the adjacent face of the crank-web 81. The outer end of the shank of the crankpin is threaded and the conical head 83 of the crankpin is fixed in its conical seating 82 by means of a locknut 97 which is screwed upon the threaded end of the shank and bears against a washer 98 interposed between the locknut and the inner race of the ball bearing. The axis of the conical head 83 of the crankpin is offset from that of the shank 84, so that by loosening the locknut 97 and turning the crankpin the throw of the latter may be varied as required for a reason which will be referred to hereinafter.

The opposite end of each connecting rod is screwed into the shank of a link 99 formed with a ball end 100 which, in order to provide a spherical joint, is arranged between the sloping wall of a recess 101 in the boss 91 or 92 on the spur wheel 89 or 90 and a conical seating 102 formed in a plug 103 which is screwed into a parallel upper part of the recess 101 in the boss 91 or 92.

As shown in Figs. 1 and 3, the meter counter mechanism (not shown) is connected to the crankshaft through a shaft 104 fitted with a mitre wheel 105 which is engaged with the mitre wheel 85 fixed to the crankshaft.

Referring to Fig. 3, all the mechanism which is external to the meter body may be covered by a hood 106 which is fixed on top of the body and is formed with an opening which is closed by a detachable cover 107. The latter is formed with an inwardly-projecting boss 107a in which the shaft 104 is turnably arranged.

Since the mitre wheel 85 on the crankshaft has the same number of teeth as the mitre wheel 86 on the vertical shaft 87, it follows that the latter and the deep pinion 88 will revolve at the same speed as the cranksaft 79. Similarly, since the spur wheels 89 and 90 have twice as many teeth as the deep pinion 88 it follows that the spur wheels with the piston rods 24 and 25 attached to them and the pistons attached to the rods will revolve at half the crankshaft speed, i. e. in one double stroke of each piston (up and down) the corresponding spur wheel 89 or 90 will revolve one half revolution and in a single stroke (up or down) it will revolve through an angle of 90°. Further, both pistons will revolve in the same direction.

If the crankshaft rotates counterclockwise when seen from its left hand end as shown in Fig. 1 and the right hand crank is following 90° behind the other crank, the two pistons will revolve clockwise when seen from the top.

Assuming that the left hand piston 37 is at the top of its stroke as shown in Fig. 1, and the inlet and outlet ports 16 and 18 in the left hand cylinder 12 are instantaneously closed by the imperforate parts 51 and 52 of the piston sleeve, as shown in Fig. 2, the right hand piston 38 is at mid-up-stroke and the inlet and outlet ports 17 and 19 of the right hand cylinder 13 are full open. The inlet port 17 communicates via the port 68 in the right piston 37a and the piston compartment 63 with which it communicates with the lower end of the cylinder since the top of the compartment is closed as previously mentioned. The upper end of the cylinder communicates via the port 69 in the piston and the piston compartment 64 with which it communicates with the outlet passage 15. The inflow of liquid to the bottom end of the right hand cylinder 13 thrusts the piston 37a therein upwards and the piston ejects the liquid in the upper end of the cylinder through the port 69 and the outlet port 19 in the cylinder into the outlet passage 15.

As the right hand piston 37a moves upwards it also rotates in the clockwise direction and by the time it reaches the top of its stroke the inlet and outlet ports 17 and 19 in the cylinder are instantaneously closed. In the meantime, the left hand piston 37 has moved from its upper dead centre position shown in Fig. 1, and has also rotated clockwise, thus opening the inlet and outlet ports 16 and 18 in its cylinder 12 and permitting the inflow of the liquid to the upper part of the cylinder and the discharge of the liquid from the lower part of the cylinder. The combined continuous reciprocating and turning movements of the pistons continue as long as liquid flows through the meter from the inlet 2 to the outlet 3.

The meter can be calibrated to deliver the exact correct quantity of liquid both by adjusting the setting of the two crankpins and by a pumping means which will be described hereinafter. As previously described, each crankpin is eccentrically mounted on its conical head 83, and after the locknut 97 on the crankpin 84 has been slackened the crankpin is rotated, thereby altering the throw of the crank and hence the stroke of the piston. When the locknut is again tightened the crankpin is prevented from turning about the axis of its conical head.

Figure 6:
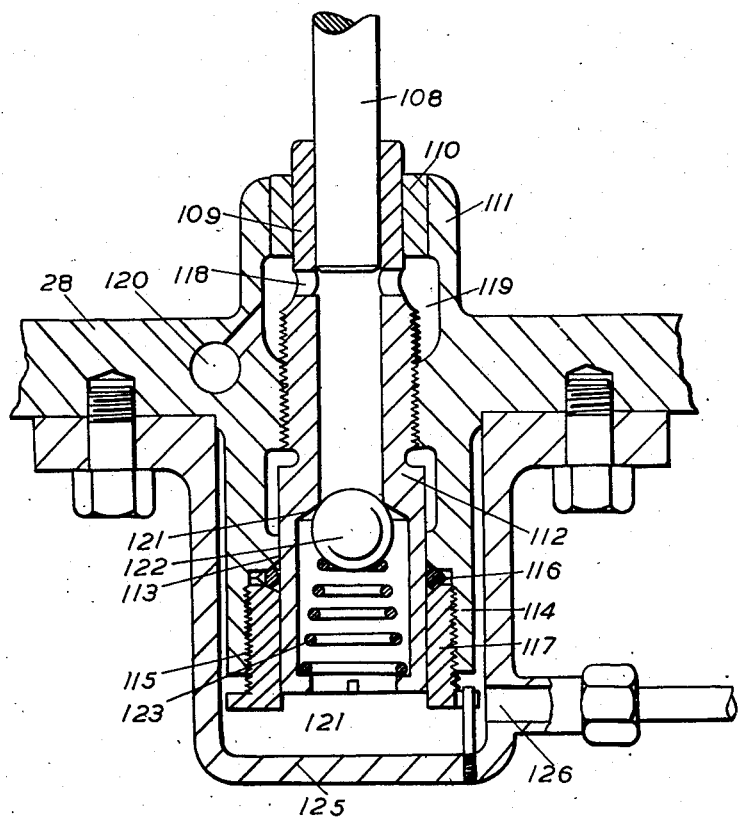
Fig. 6 is a sectional elevation of a calibrating or compensating pump which is used for adjusting the meter for volumetric accuracy.

Referring to Fig. 6, in the abovementioned alternative method of calibrating the meter the bottom end of one or each of the piston rods is made to function as a compensating pump plunger.

In this modified construction the lower end of the piston rod 108 is slidably guided in a pump cylinder or sleeve 109 which is screwed into the bottom cover 28 of the meter cylinder, the upper end of the cylinder being slidably guided in a collar 110 fitted in the upper end of a hollow boss 111 projecting upwards from the bottom cover. The lower end 112 of the pump cylinder is turnably guided in a flange 113 formed in a hollow boss 114 projecting downwardly from the bottom cover. Below the flange 113 the downwardly-projecting boss is counterbored and threaded at 115 and leakage of liquid along the lower part of the pump cylinder is prevented by a sealing gasket 116 which surrounds the lower part and is locked between a gland 117, which is screwed into the threaded counter-bore, and the flange 113.

Below the guide collar 110 the upper part of the pump cylinder is formed with inlet ports 118 which communicate with an annular space 119 in the boss 111 around the cylinder, the annular space being connected to a passage 120 in the bottom cover which is connected to the meter outlet. The lower end of the pump cylinder is counter-bored to form a valve chamber 121 in which a discharge ball valve 122 is held by a spring 123 against a valve seat 124 at the lower end of the cylinder bore in which the piston rod is slidable.

The downwardly-projecting boss 114 on the cylinder cover is enclosed in a cap 125 which is fixed to the cover and is formed with a liquid discharge branch 126 which is connected to the meter inlet.

As the discharge valve 122 is held on its seat by its spring a void is formed in the pump cylinder by the piston rod on its upstroke and, when towards the end of its stroke, the piston rod uncovers the inlet ports 118 liquid from the outlet side of the meter flows into the pump cylinder.

On the succeeding down stroke of the piston rod, as soon as the inlet ports 118 are covered by the rod the entrapped liquid is discharged past the discharge valve 122 into the chamber 121 from which it passes through the discharge passage 126 to the inlet side of the meter. The amount of liquid so discharged can be varied by adjusting the pump cylinder 109 up or down thereby adjusting the position of the inlet ports 118 relative to the stroke of the rod 108 and rendering more or less of that stroke effective.

The meter is constructed in such a way that it passes a slightly greater quantity of liquid than is recorded on the meter counter and the abovedescribed compensating pump device returns the excess quantity of liquid back to the meter inlet, thus providing an adjustable means of correction.

It should be noted that as the pressure on the outlet side of the meter is always less than the pressure on the inlet side (by an amount representing the friction of the meter) there can never be any tendency for the discharge valve 122 to be forced slightly off its seat and permit of unmeasured leakage.

On the other hand, it should also be noted that since the abovementioned compartments 42, 44 and 63, 65 in the meter pistons are always in communication with each other through the lower parts of the metering cylinders 12 and 13, similarly, the other two compartments 43, 45 and 62, 64 are also in communication with each other through the upper parts of the cylinders, it follows that whatever pressure, inlet or outlet, may be applied to the pistons the lateral forces resulting therefrom are always equal and opposite and hence the pistons are always in lateral equilibrium and no frictional resistance can arise due to their being thrust against one side or other of the cylinders. The meter will therefore be practically frictionless and the difference of pressure between the inlet and outlet will always be extremely small.

Fig. 7 shows an alternative method of connecting the lower ends of the connecting rods 93 and 94 to the spur wheels 89 and 90. As shown in Fig. 7 the lower end of the connecting rod 93 may be pivotally mounted upon a gudgeon pin 126 which is arranged in diametrically opposite transverse holes in a bush 127, the holes communicating with a central slot 128 in the bush. In this construction, the split boss 92 which is fixed at the upper end of the piston rod 24 is formed with a recess 129 in which the outer race 130 of a ball bearing is fitted upon a shoulder 131, the bush 127 being fitted in the inner race of the ball bearing. The spur wheel 89 is formed with an upstanding boss 132, the top of which is formed with an opening 133 and which is formed with a circular recess 134 in which the outer race 130 of the ball bearing is fitted. The ball bearing is thus held against axial movement between the shoulder 131 in the boss 92 and a parallel shoulder 135 in the boss 132. The lower end of the bush 127 is formed with a head 136 and the upper end of the bush is threaded externally to receive a locknut 137. The bush is thus held against axial movement in the inner race of the ball bearing by the engagement of the inner race between the head 136 and the locknut 137.

The arrangement permits the spur wheel 89 to rotate while the bush retains its orientation as determined by the gudgeon pin 126.

Referring to Fig. 7, all the mechanism which controls the movements of the pistons may be enclosed within a casing 138, the bottom of which is closed by a base plate 139 having a boss 140, which is bored to receive the upper end of the piston rod 24 or 25 projecting upwardly through the central guiding boss 22 or 23, Fig. 1, of the cylinder cover 20 or 21. The sealing gaskets 26 and 27 are fitted so as to form sealing glands around each piston rod where the rod projects through the cylinder cover and another sealing gasket 141 is fitted around the piston in the boss 140 on the base plate.

It will be understood that the meter body and the casing 138 are arranged so as to constitute two separate units connected only by the upper ends of the piston rods, except for a protective casing which will be referred to hereinafter.

The piston rods are so formed that there is a section (hereinafter referred to as "the neutral section") of each rod which at no time enters either the meter body or the casing 138 comprising all the mechanism controlling the movements of the pistons.

The object of this form of construction is to prevent any creep of the liquid contents of the meter, along that section of a piston rod which enters the meter body, contaminating the mechanism controlling the movement of the piston, and similarly to prevent the liquid within the meter body being contaminated by lubricant used for the mechanism controlling the movement of the piston.

The said neutral section of a piston rod could comprise a quick-release coupling 142, Fig. 7, of the claw type such that the meter piston could be withdrawn from its cylinder for the purpose of cleaning without disturbing the driving mechanism. This quick release coupling would be of such diameter that it would not increase the diameter of the piston rod at the point of attachment, thus enabling the piston rod to be withdrawn through the sealing gland.

The piston rod would be withdrawn by removal of the cylinder cover remote from the driving mechanism.

Both upper ends of the piston rods projecting upwardly through their cylinder covers, as described, above, they may be enclosed without a protective casing uniting the meter body with the casing containing the mechanism controlling the piston movement.

I claim:

1. A motor for a positive displacement liquid meter having a meter counter mechanism, said motor comprising a body having a main liquid inlet and a main liquid outlet, means forming at least two spaced parallel cylinders vertically positioned in said body, each cylinder having a liquid inlet and a liquid outlet angularly spaced relative to each other, there being passageways formed in said body connecting said main liquid inlet with both said cylinder liquid inlets and connecting both said cylinder liquid outlets with said main liquid outlet, a double-acting piston reciprocable and rotatable in each cylinder, said pistons being reciprocable under the pressure of the liquid flowing through the meter, each piston having a compartment therein open to the cylinder space above said piston, said piston compartment having a port adapted alternately to be placed in communication with said cylinder inlet and outlet, each piston also having a second compartment therein open to the cylinder space below said piston, said second compartment having a port adapted alternately to be placed in communication with said cylinder inlet and outlet, mechanism including piston rods and gearing interconnecting said pistons so that as said pistons are reciprocated they rotate continuously in the same direction selectively to establish communication between said piston compartments and said cylinder inlets and outlets whereby the flow of liquid from said main liquid inlet through said cylinders to said main outlet is controlled, and take-off means connected to said interconnecting mechanism for transmitting the reciprocating motion of said pistons to said meter counter mechanism to operate the latter.

2. The combination set forth in claim 1, wherein said interconnecting mechanism includes a crankshaft, crankpins connected to said crankshaft, and a connecting rod connecting each piston rod to a crankpin.

3. The combination set forth in claim 2, wherein said crankpins are angularly offset relative to each other whereby the reciprocating and rotating movement of said pistons is such that liquid is simultaneously admitted to and discharged from each cylinder so that the liquid pressure acting to reciprocate said pistons is not restricted.

4. The combination set forth in claim 3, wherein said crankpins are angularly offset at 90°, so that the piston which is changing the angular position of its ports at one of its dead center positions is being driven by the other piston which is in its mid-stroke position.

5. The combination set forth in claim 1, wherein said interconnecting mechanism includes a crankshaft, crankpins connected to said crankshaft, and a connecting rod connecting each piston rod to a crankpin, and wherein further the gearing includes synchronizing gear wheels fixed to each piston rod, and a synchronizing pinion driven from said crankshaft and connected to drive said synchronizing gear wheels.

6. The combination set forth in claim 1, wherein said interconnecting mechanism includes a chankshaft, crankpins connected to said crankshaft, and a connecting rod connecting each piston rod to a crankpin, each crankpin being adjustably eccentrically mounted in its crankweb so that the effective throw of the crankshaft and thus the piston stroke may be adjusted thereby to adjust the meter for volumetric accuracy.

7. The combination set forth in claim 1, including means to adjust the volumetric capacity of the meter comprising means forming a pump cylinder having an inlet port and an outlet port, said pump cylinder being aligned with a piston rod the end of which is reciprocable in said pump cylinder to form a pump plunger, said inlet port being so located that its opening and closing is controlled by said plunger, said pump inlet port being connected to said main outlet and said pump outlet port being connected to said main inlet, and said cylinder being adjustable axially so that the quantity of liquid pumped through said pump cylinder may be varied.

8. A motor for a positive displacement liquid meter having a meter counter mechanism, said motor comprising a body having a main liquid inlet and a main liquid outlet, means forming at least two spaced parallel cylinders vertically positioned in said body, each cylinder having a liquid inlet and a liquid outlet angularly spaced relative to each other, there being passageways formed in said body connecting said main liquid inlet with both said cylinder liquid inlets and connecting both said cylinder liquid outlets with said main liquid outlet, a double-acting piston reciprocable and rotatable in each cylinder, said pistons being reciprocable under the pressure of the liquid flowing through the meter, each piston being hollow and internally divided into an even number of compartments with half of said compartments open to the cylinder space above the piston and the other half open to the cylinder space below the piston, each compartment having a port adapted to be brought into communication with said cylinder inlet and outlet as said piston is rotated, mechanism including piston rods and gearing interconnecting said pistons so that as said pistons are reciprocated they are rotated continuously in the said direction, and take-off means connected to said interconnecting mechanism for transmitting the reciprocating motion of said pistons to said meter counter mechanism to operate the latter.

References Cited in the file of this patent

UNITED STATES PATENTS

| Number | Name | Date |
|---|---|---|
| 617,529 | Howard | Jan. 10, 1899 |
| 763,133 | Wheeler | June 21, 1904 |
| 919,842 | Farrar | Apr. 27, 1909 |
| 1,342,422 | Chase | June 8, 1920 |
| 1,912,687 | Brouse | June 6, 1933 |
| 1,956,281 | Granberg | Apr. 24, 1934 |
| 1,969,024 | Miano | Aug. 7, 1934 |
| 2,144,748 | Arnold et al. | Jan. 24, 1939 |
| 2,286,411 | Hazard | June 16, 1942 |
| 2,531,620 | Grise | Nov. 28, 1950 |

FOREIGN PATENTS

| Number | Country | Date |
|---|---|---|
| 1,419 | Great Britain | 1873 |
| 1,097 | Germany | Sept. 25, 1877 |
| 20,256 | Great Britain | 1910 |